March 6, 1945.  A. A. MERCER  2,370,742
TOOL HOLDER
Filed Nov. 6, 1942  2 Sheets-Sheet 1
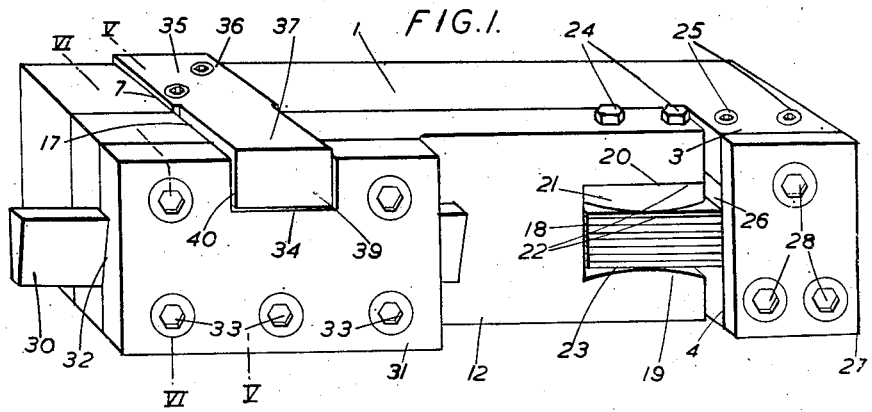
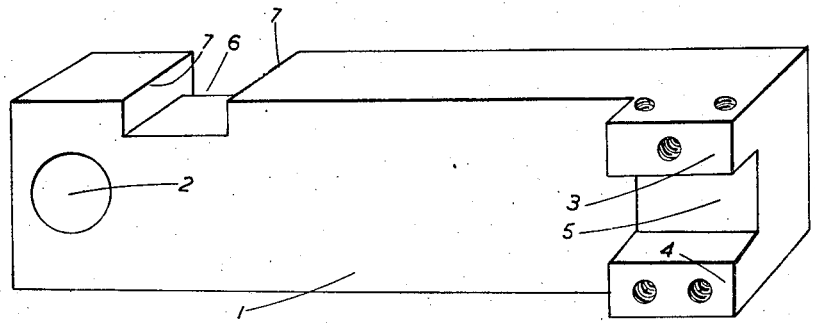
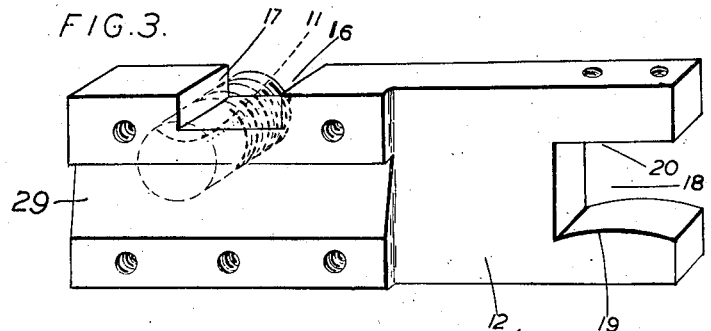
Inventor,
Arthur Alexander Mercer,
By
Frank S. Appleman,
Attorney,

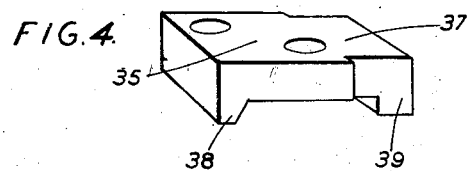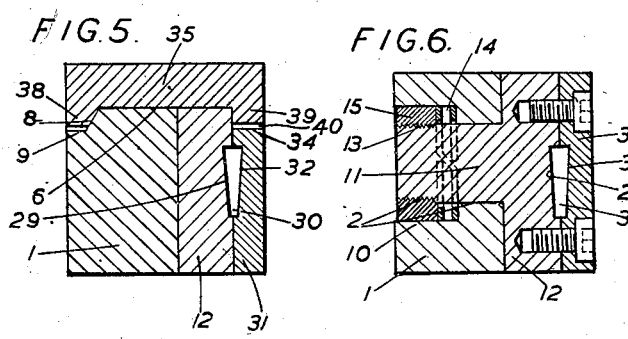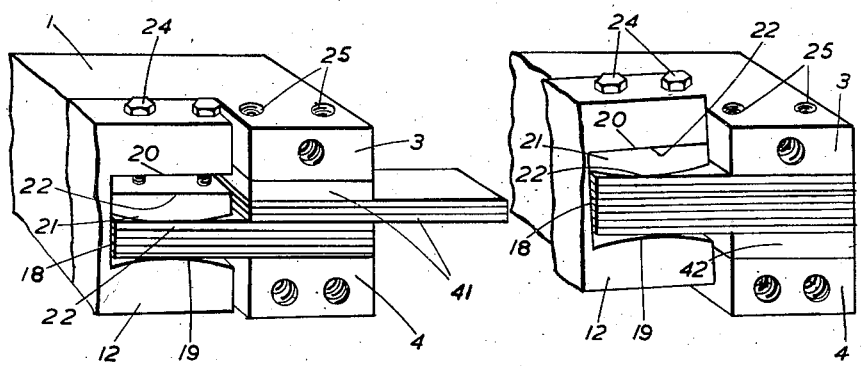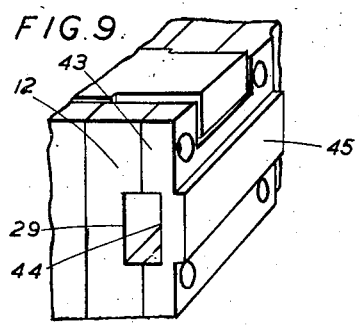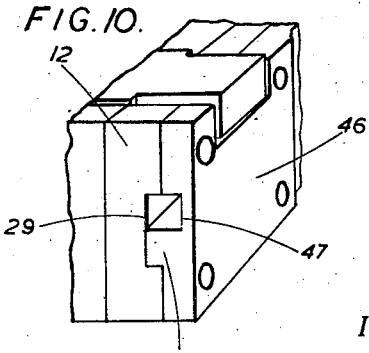

Patented Mar. 6, 1945

2,370,742

UNITED STATES PATENT OFFICE 2,370,742

TOOLHOLDER

Arthur Alexander Mercer, Colchester, England, assignor of one-half to E. N. Mason & Sons Limited, Colchester, England, a British company Application November 6, 1942, Serial No. 464,798
In Great Britain November 27, 1941

11 Claims. (Cl. 29—97.5)

This invention relates to tool holders for metal working machines, wherein the workpiece may have a rotary or reciprocating movement, as for example in lathes, planing or shaping machines, or similar machine tools.

It is well known that the machining of high tensile alloys, especially steels, imposes a considerable strain on the cutting tools. During the operation the tools, which are rigidly mounted in rigidly mounted tool holders, are frequently subjected to pressures in excess of the maximum yield point of the material of which the tool is made whereby the tool may be distorted or even broken.

The object of the present invention is to provide a tool holder in which the tool is mounted in such a manner that it is capable of yielding when it meets a predetermined resistance, thus avoiding the disadvantage of distortion or breakage or at least reducing this disadvantage to a minimum.

According to the present invention a tool holder for a metal working machine is provided with a pivoted member for receiving a tool, the pivoted member being subjected to the action of a spring for holding the tool resiliently in engagement with a workpiece to be operated upon.

The pivoted member is preferably in the form of a lever provided with a lateral boss for engagement with a corresponding seating in the tool holder, one end of the lever being acted upon by the spring whilst the other end of the lever is adapted to carry the tool.

The spring is preferably a laminated blade spring of which one end is secured to the holder, whilst the other end of the spring is secured to the end of the lever.

The spring may be adjustable so as to hold the lever in various angular positions relatively to the workpiece and/or to allow the tool to yield when it meets a predetermined resistance.

The invention will now be described by way of example with reference to the accompanying drawings, wherein—

Fig. 1 is a perspective view of a tool holder,

Fig. 2 is a perspective view of the main body of the tool holder shown in Fig. 1, Fig. 3 is a perspective view of a lever, Fig. 4 is a perspective view of a retaining keep, Figs. 5 and 6 are sections on the lines V—V and VI—VI respectively of Fig. 1, Figs. 7 and 8 are perspective views of methods of packing, and Figs. 9 and 10 show modified forms of clamping plates.

Referring first to Figs. 1 to 6, a tool holder is provided with a main body or block 1 of suitable cross section, preferably rectangular, so as to enable it to be secured to the machine tool support in the usual manner.

Near one end of the body 1 is provided a circular bore 2, extending through the thickness of the body 1, which is normal to the vertical and longitudinal axes of the body.

At or near the other end of the body 1 are provided, preferably integrally therewith, two spaced projections 3, 4, the centre of the space 5 between these projections 3, 4, corresponding approximately with the centre of the bore 2.

In the top of the body 1, near the same end thereof as the bore 2 but spaced inwardly further than the latter, is provided a recess 6 which may have parallel walls 7 as shown or undercut walls, the longitudinal axis of this recess 6 being parallel to the axis of the bore 2. On the side of the body 1 remote from the projections 3, 4 the recess 6 is inclined downwardly and outwardly as shown at 8, Fig. 5, and terminates in a horizontal portion 9.

On this side of the body 1 the bore 2 is enlarged, as indicated at 10, Fig. 6, for about half of its length.

With the bore 2 engages a fulcrum pin 11 of a lever 12, Fig. 2, of rectangular cross section. The pin 11 is screw-threaded at its end 13 and is secured in the bore 2 by a spring washer 14 and a nut 15, with or without a lock nut, the washer 14 and nut 15 or nuts being accommodated in the enlarged portion 10 of the bore 2.

On its upper side of the lever 12 is provided with a recess 16 which, when the fulcrum 11 is in engagement with the bore 2, is in register with the recess 6 in the top of the body 1. The recess 16 in the lever 12 is of the same width as the recess 6 in the body 1 and the sides 17 thereof also correspond with the sides 7 of the recess 6 of the body 1.

In the end of the lever 12 remote from the fulcrum pin 11 is provided a slot 18 which is curved or arched on one side, preferably the bottom 19, whilst the other side 20 is flat. Adjacent the flat side 20 of the slot 18 is located a block 21, of which one side 22 is flat, which is located next to the flat side 20 of the slot 18, whilst the other side 22 is curved or arched.

Between the curved or arched faces 20, 22 of the slot 18 and block 21 are fitted the ends of a number of blade springs 23 which are held in position by one or more (preferably two) adjusting screws 24 which pass through the lever 12 and press against the block 21.

The other ends of the springs 23 engage with the space between the two projections 3, 4 in which they are held by one or more, preferably two, screws 25, which bear against the springs 23 directly or through the medium of suitable packing 26.

As an additional security for retaining the ends of the springs 23 between the projections 3, 4 a retaining plate 27 may be bolted by bolts 28 to the projections 3, 4.

On the face of the lever 12 remote from the fulcrum pin 11 is provided a recess 29 corresponding with half the thickness of a tool 30.

The tool 30 is held in position on the lever 12 by a clamp plate 31 provided with a complementary recess 32 for receiving the tool 30 and which is bolted to the lever 12 by bolts 33.

The clamp plate 31 is provided at the top with a recess 34 which when the clamp plate 31 is bolted to the lever 12 registers with the recesses 6 and 16 in the top of the body 1 and the lever 12 but is deeper than these recesses.

In order to press the lever 12 firmly against the body 1 there is provided a retaining keep 35, Fig. 4, which engages with the recesses 6, 16, 34 in the top of the body 1, lever 12 and clamp plate 31. The retaining keep 35 is bolted to the body 1 by bolts 36.

The portion 37 of the retaining keep 35 which engages with the recesses 16, 34 in the lever 12 and the clamp plate 31 is narrower than these recesses and normally does not engage the bottom of the recess 16 in the lever 12.

At its opposite ends the retaining keep 35 is provided with downwardly extending projections 38, 39. one, 38, of which engages with the inclined portion 8 of the recess 6 in the top of the body 1, whilst the other 39 engages with the outer face of the lever 12 (Fig. 5) and with the recess 34 in the clamp plate 31 but does not reach the bottom of this recess 34.

The clearance 40 between the retaining keep 35 and the walls of the recesses in the lever 12 and the clamp plate 31 is sufficient to permit maximum movement of the lever 12.

It will be understood that the retaining keep 35 may be of uniform width throughout, in which case the recesses 16, 34 in the lever 12 and clamp plate 31 are made wider to provide the necessary clearance.

With an arrangement as above described the "yield" of the springs 23 may be varied by varying the pressure applied to the springs 23 by the screws 24, 25 or by varying the number of springs 23. By placing packing 41, Fig. 7, above the springs 23 between the projections 3, 4 or by placing packing 42 (Fig. 8) below the springs 23, the height and angle of the cutting tool 30 can be adjusted.

During machining alternating pressures frequently occur between the workpiece and the tool 30. With a tool 30 mounted in a tool holder according to the invention any excess pressure applied to the tool results in the tool moving downwardly and away from the workpiece, the tool turning about the axis of the fulcrum pin 11. This action takes place whenever a period of excessive pressure occurs.

As is well understood in operations such as parting, i. e., separating discs from a cylindrical rod or the like, the pressure of the cut diminishes as the radius of the workpiece decreases. Under these conditions a tool mounted in a holder, according to the invention, is self-compensating and consequently the thickness of the shaving varies in proportion to the resistance presented to the tool during the seperating operation.

As shown in Fig. 9 a clamp plate 43 is provided on one side with a recess 44 which registers with the recess 29 in the lever 12 and on the other side with a rib or projection 45 of a size to engage with the recess 29. As the plate 43 is reversible tools of two different thicknesses can be clamped in the recess 29 by the plate 43.

Fig. 10 shows a clamp plate 46 provided with a recess 47 and a projection 48, for engagement with the recess 29 in the lever 12, so that a tool can be clamped in the vacant portion of the recess 29 and in the recess 47.

I claim:

1. A tool holder comprising a body, said body being provided with a bore, a member for receiving a tool pivotally mounted on said body, said pivoted member being in the form of a lever, a lateral boss on said lever, said lateral boss engaging with said bore, a clamping plate secured to said lever for clamping said tool to said lever, a retaining keep engaging said body and said lever, said lever having a slot therein, and spring means having one end secured to said body and the other end secured in the slot of said lever, said spring means being adapted to hold said tool resiliently in engagement with a work piece to be operated upon.

2. A tool holder comprising a body, said body being provided with a bore, a member for receiving a tool pivotally mounted on said body, said pivoted member being in the form of a lever, a lateral boss on said lever, said lateral boss engaging with said bore, a clamping plate secured to said lever for clamping said tool to said lever, a retaining keep engaging said body and said lever, said lever having a slot therein, and spring means between said body and said lever, said spring means being in the form of a laminated blade spring, one end of said spring being secured to said body, whilst the other end of said spring is secured in the slot of said lever, said spring means being adapted to hold said tool resiliently in engagement with a workpiece to be operated upon.

3. A tool holder comprising a body, said body being provided with a bore, a member for receiving a tool pivotally mounted on said body, said pivoted member being in the form of a lever, a lateral boss on said lever, said lateral boss engaging with said bore, a clamping plate secured to said lever for clamping said tool to said lever, a retaining keep engaging said body and said lever, said lever having a slot therein, means for adjusting the angular position of said lever relatively to said workpiece, and spring means having one end secured to said body and the other end secured in the slot of said lever, said spring means being adapted to hold said tool resiliently in engagement with a work piece to be operated upon.

4. A tool holder comprising a body, said body being provided with a bore, a member for receiving a tool pivotally mounted on said body, said pivoted member being in the form of a lever, a lateral boss on said lever, said lateral boss engaging with said bore, a clamping plate secured to said lever for clamping said tool to said lever, a retaining keep engaging said body and said lever, said lever having a slot therein, and spring means having one end secured to said body and the other end secured in the slot of said lever, said body being in the form of a rectangle, spaced rectangular projections at one end of said block, said spaced projections being adapted to receive between them one end of said spring means, said bore being located at the other end of said block and having its axis located in a plane passing midway between said projections, said spring means being adapted to hold said tool resiliently in engagement with a workpiece to be operated upon.

5. A tool holder comprising a body, said body being provided with a bore, a member for receiving a tool pivotally mounted on said body, said pivoted member being in the form of a lever, a lateral boss on said lever, said lateral boss engaging with said bore, a clamping plate secured to said lever for clamping said tool to said lever, a retaining keep engaging said body and said lever, said lever having a slot therein, and spring means having one end secured to said body and the other end secured in the slot of said lever, one side of said slot being curved whilst the opposite side is flat, a block located in said slot, said block having a flat side and a curved side, the curved sides of said slot and said holder being curved and directed towards one another, said spring means being adapted to hold said tool resiliently in engagement with a workpiece to be operated upon.

6. A tool holder comprising a body, said body being provided with a bore, a member for receiving a tool pivotally mounted on said body, said pivot member being in the form of a lever, said lever being provided at one end with a slot, one side of said slot being curved whilst the opposite side is flat, a block located in said slot, said block having a flat side and a curved side, the curved sides of said slot and said holder being curved and directed towards one another, and a lateral boss on said lever near the end thereof remote from the slot, said boss engaging with said bore, the axis of said boss being located in a plane passing midway between the sides of said slot, spring means having one end secured to said body and the other end secured in the slot of said lever, said lever having a longitudinal recess in the face thereof remote from said boss, said recess being adapted to receive a tool, a clamp plate adapted to bear against the said of said lever provided with said recess so as to secure a tool in said recess, means for securing said clamp plate to said lever, and a retaining keep engaging said body and said lever.

7. A tool holder comprising a body, said body being provided with a bore, a member for receiving a tool pivotally mounted on said body, said pivoted member being in the form of a lever, a lateral boss on said lever, said lateral boss engaging with said bore, said lever having a slot therein, spring means having one end secured to said body and the other end secured in the slot of said lever, a clamp plate, means for securing said clamp plate to said lever, said clamp plate serving to secure a tool to said pivoted member, said body, said lever and said clamp plate each having a recess in the top surface thereof, said recesses being in register when said body, said lever and said clamp plate are assembled, the recess in said body having a depressed portion, connected to the normal portion by an incline, said recess in said clamp plate being deeper than the recess in the pivoted member and the normal portion of the recess in the body, a retaining keep, and two projections on said keep, one projection being located at each end of said keep, one of said projections being of a shape corresponding with the depressed portion of the recess in said body, said keep engaging with said recesses, the shaped projection engaging with the depressed portion of the recess in the body whilst the other projection passes into the recess in the clamp plate and bears against the pivoted member, said keep having a portion of reduced width which engages with the recesses in the lever and clamp plate.

8. A tool holder comprising a body, said body being provided with a bore, a member for receiving a tool pivotally mounted on said body, said pivoted member being in the form of a lever, a lateral boss on said lever, said lateral boss engaging with said bore, said lever having a slot therein, spring means having one end secured to said body and the other end secured in the slot of said lever, said lever being provided at one end with a slot, one side of said slot being curved whilst the oposite side is flat, a block located in said slot, said block having a flat side and a curved side, the curved sides of said slot and said holder being curved and directed towards one another, the said boss on said lever being located near the end thereof remote from the slot, the axis of said boss being located in a plane passing midway between the sides of said slot, said lever having a longitudinal recess in the face thereof remote from said boss, said recess being adapted to receive a tool, a clamp plate adapted to bear against the side of said lever provided with said recess so as to secure a tool in said recess, means for securing said clamp plate to said lever, said clamp plate having a recess therein which, when the clamp plate is secured to said lever, registers with the recess in said lever, said recesses being adapted to receive a tool, and a retaining keep engaging said body and said lever.

9. A tool holder comprising a body, said body being provided with a bore, a member for receiving a tool pivotally mounted on said body, said pivoted member being in the form of a lever, a lateral boss on said lever, said lateral boss engaging with said bore, said lever having a slot therein, spring means having one end secured to said body and the other end secured in the slot of said lever, said lever being provided at one end with a slot, one side of said slot being curved whilst the opposite side is flat, a block located in said slot, said block having a flat side and a curved side, the curved sides of said slot and said holder being curved and directed towards one another, said boss on said lever being located near the end thereof remote from the slot, the axis of said boss being located in a plane passing midway between the sides of said slot, said lever having a longitudinal recess in the face thereof remote from said boss, said recess being adapted to receive a tool, a clamp plate adapted to bear against the side of said lever provided with said recess so as to secure a tool in said recess, means for securing said clamp plate to said lever, said clamp plate having a recess therein, said recess extending over a portion of the recess in said lever, and a projection on said clamp plate, said projection being adapted to engage with the recess in said lever, and a retaining keep engaging said body and said lever.

10. A tool holder comprising a body, said body being provided with a bore, a member for receiving a tool pivotally mounted on said body, said pivoted member being in the form of a lever, a lateral boss on said lever, said lateral boss engaging with said bore, said lever having a slot therein, spring means having one end secured to said body and the other end secured in the slot of said lever, said lever being provided at one end with a slot, one side of said slot being curved whilst the opposite side is flat, a block located in said slot, said block having a flat side and a curved side, the curved sides of said slot and said holder being curved and directed towards one another, said boss on said lever being located near the end thereof remote from the slot, the axis of said boss being located in a plane passing midway between the sides of said slot, said lever having a longitudinal recess in the face thereof remote from said boss, said recess being adapted to receive a tool, a clamp plate adapted to bear against the side of said lever provided with said recess so as to secure a tool in said recess, means for securing said clamp plate to said lever, said clamp plate having on one face a recess, said recess being adapted to co-operate with the recess in said lever so as to receive a tool, a rib on the other face of said clamp plate, said rib being adapted to enter partly said recess in said lever, said clamp plate being reversible so as to enable different tools to be secured between said lever and said clamp plate, and a retaining keep engaging said body and said lever.

11. A tool holder comprising a body, said body being provided with a bore, a member for receiving a tool pivotally mounted on said body, said pivoted member being in the form of a lever, a lateral boss on said lever, said lateral boss engaging with said bore, a clamping plate secured to said lever for clamping said tool to said lever, a retaining keep engaging said body and said lever, and spring means between said body and said lever, said body comprising a rectangular block, and spaced lateral projections at one end of said block, said spaced projections being adapted to receive between them one end of said spring means, the axis of said bore being located in a plane passing midway between said projections, a plate secured to said projections for holding the end of said spring means between said projections, and packing between said spring means and at least one of said projections.

ARTHUR ALEXANDER MERCER.